United States Patent
Hsieh

(10) Patent No.: US 12,208,493 B2
(45) Date of Patent: *Jan. 28, 2025

(54) ROLLER WRENCH

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/183,216

(22) Filed: Feb. 23, 2021

(65) Prior Publication Data

US 2021/0260728 A1   Aug. 26, 2021

Related U.S. Application Data

(60) Provisional application No. 63/003,775, filed on Apr. 1, 2020, provisional application No. 62/981,322, filed on Feb. 25, 2020.

(51) Int. Cl.
  *B25B 13/46* (2006.01)
  *F16D 71/04* (2006.01)
(52) U.S. Cl.
  CPC .......... *B25B 13/463* (2013.01); *B25B 13/462* (2013.01); *F16D 71/04* (2013.01)
(58) Field of Classification Search
  USPC .............................. 81/58, 59.1, 59.2; 192/44
  See application file for complete search history.

(56) References Cited

U.S. PATENT DOCUMENTS

| | | | | |
|---|---|---|---|---|
| 5,145,042 A | * | 9/1992 | MacPherson | F16D 41/088 74/333 |
| 5,937,981 A | * | 8/1999 | Adams | F16D 41/084 81/63.1 |
| 5,941,140 A | * | 8/1999 | Suksi | B25B 13/462 81/59.1 |
| 7,464,801 B2 | * | 12/2008 | Wittkopp | F16D 41/088 192/44 |
| 2005/0120832 A1 | * | 6/2005 | Chiang | B25B 13/461 81/59.1 |

* cited by examiner

*Primary Examiner* — Joel D Crandall
*Assistant Examiner* — Jonathan R Zaworski
(74) *Attorney, Agent, or Firm* — CKC & Partners Co., LLC

(57) ABSTRACT

A roller wrench including a body with a circular chamber; a driving member with multiple sides capable of rotating in the chamber; a plurality of rollers installed in the chamber and located between a side of the driving member and a peripheral wall of the chamber; and a reversing knob capable of driving the rollers to move. Each of the sides of the driving member has a central area, a concave latching surface is respectively provided on two sides of the central area, and a concave state of each of the latching surfaces is gradually concaved inwardly from an inner side to an outer side. When each of the rollers is located on one edge of each of the sides, a peripheral surface of the roller contacts with the latching surface and the peripheral wall of the chamber; the body, rollers and driving member are latched with one another.

12 Claims, 18 Drawing Sheets

ROLLER WRENCH

CROSS REFERENCE TO RELATED APPLICATION

This patent application claims priority to U.S. Provisional Patent Application Ser. No. 62/981,322, entitled "ROLLER WRENCH", filed on Feb. 25, 2020, and priority to U.S. Provisional Patent Application Ser. No. 63/003,775, entitled "ROLLER WRENCH", filed on Apr. 1, 2020.

BACKGROUND OF THE INVENTION

Field of Invention

The invention is related to wrenches, and more particularly to a roller wrench.

Related Art

FIG. 1 shows a conventional reversible roller wrench 10, a driving member 14 is installed in a circular chamber 12 of a head 11, the driving member 14 has six sides 15, a center of each of the sides 15 has a concave portion 152, and the concave portion 152 makes two edges of each of the sides 15 respectively form a latching surface 151. Six rollers 16 are installed between the six sides 15 and a peripheral wall 13 of the chamber 12 respectively. A reversing knob 17 is installed on a top of the head 11, and six walls 171 are protrudingly provided on a bottom surface of the reversing knob 17 and six limiting grooves 172 are formed between the six walls 171; the six rollers 16 are respectively limited in the six limiting grooves 172, as shown in FIG. 2. The reversing knob 17 can be rotated and positioned at two positions by the three elastic positioning components 18. Please refer to FIGS. 1 and 3, the three elastic positioning components 18 are respectively installed in three holes 173 provided on the bottom surface of the reversing knob 17, a top surface of the driving member 14 is provided with two sets of positioning holes 153 and 154, and the elastic positioning components 18 can be elastically snapped into either one set of the two sets of positioning holes 153 and 154.

When the reversing knob 17 is rotated in one direction, the reversing knob 17 can be switched to be positioned at a first position, as shown in FIG. 2. At this time, one ends of the three elastic positioning components 18 are elastically snapped into the first set of the positioning holes 153, and this makes each of the rollers 16 to contact with the latching surface 151 (such as the latching surface on the left edge) at one edge of each of the sides 15; when the reversing knob 17 is rotated in another direction, the reversing knob 17 can be switched to a second position, and the rollers 16 are respectively moved to another edge of each of the sides 15 so that each of the rollers 16 is in contact with the latching surface 151 (for example, the latching surface on the right edge) at another edge of each of the sides 15; and the elastic positioning components 18 are elastically snapped into the second set of the positioning holes 154 respectively. By switching the reversing knob 17 to the first position or the second position, the roller wrench 10 has a reversing function.

Each of the rollers 16 has a disengaging-engaging function with the latching surface 151 with which the roller 16 is in contact. Taking the latching surface 151 on the left edge of FIG. 2 as an example, there is an included angle θ between each of the latching surfaces 151 and the peripheral wall 13 of the chamber 12, on the left side of the latching surface 151, a gap between the latching surface 151 and the peripheral wall 13 gradually decreases, and on the right side of the latching surface 151, a gap between the latching surface 151 and the peripheral wall 13 gradually increases. When the wrench 10 is turned clockwise, the roller 16 moves toward a direction of a small gap, and therefore, each of the rollers 16, each of the corresponding latching surfaces 151 and the peripheral wall 13 of the chamber 12 are latched with one another, and the wrench 10 can drive the driving member 14 to turn clockwise; conversely, when the wrench 10 is turned counterclockwise, the roller 16 moves toward a direction of a large gap, each of the rollers 16, each of the corresponding latching surfaces 151 and the peripheral wall 13 of the chamber 12 cannot be latched with one another, and the wrench 10 cannot drive the driving member 14 to rotate.

The disengaging-engaging function of the conventional roller wrench 10 is convenient to operate, however, the inventor found that the conventional structure has a defect of being incapable of operating effectively. The reason is that the two latching surfaces 151 of each of the sides 15 of the driving member 14 are located on a same plane, so that a degree of the included angle θ is large, and a width of the gap between each of the latching surfaces 151 and the peripheral wall 13 of the chamber 12 varies greatly, that is, a width of the gap between each of the latching surfaces 151 and the peripheral wall 13 is rapidly reduced within a short distance. Therefore, when the roller 16 moves toward a direction of a small gap, each of the rollers 16 can only move a small distance on each of the corresponding latching surfaces 151, and the situation in which this type of roller 16 being capable of only moving slightly causes the each of the rollers 16, each of the corresponding latching surfaces 151 and the peripheral wall 13 being incapable of effectively latching with one another, resulting in easy failing of the wrench 10's disengaging-engaging function. Furthermore, a torque provided by the conventional roller wrench 10 is relatively low.

SUMMARY OF THE INVENTION

The invention aims to solve the above-mentioned drawbacks, and its main object is to provide a roller wrench and to make the roller wrench capable of effectively producing disengaging-engaging function.

Another object of the invention is to provide a roller wrench capable of increasing a torque thereof.

In order to achieve the above-mentioned objects, the roller wrench provided by the invention comprises:
  a body with a head, a circular chamber being disposed in the head;
  a driving member being a regular polygonal component with a plurality of sides, the driving member installed in the chamber of the head and capable of rotating in the chamber;
  a plurality of rollers installed in the chamber and respectively located between the sides of the driving member and a peripheral wall of the chamber; and
  a reversing knob rotatably installed on the head and capable of driving the rollers to move in the chamber, so that each of the rollers moves between one edge and another edge of each of the sides of the driving member; wherein:
  each of the sides of the driving member has a central area, a concave latching surface is respectively provided on two sides of the central area, each of the latching surfaces has an inner side connected to the central area and an outer side away from the central area, a concave state of each of the latching surfaces is gradually concaved inwardly from the inner side to the outer side; an included angle with a small degree is formed between each of the latching surfaces and the central area of each of the sides; when each of the rollers is located on one edge of each of the sides, a peripheral surface of the roller contacts with each of the corresponding latching surfaces and the peripheral wall of the chamber, so that the body, the rollers and the driving member are latched with one another.

With disposition of the two latching surfaces, the body, the rollers and the driving member are capable of reliably producing a disengaging-engaging function.

Preferably, the central area of each of the sides is a flat surface.

Preferably, the included angle is between 1 degree and 10.4 degrees, or between 4.3 degrees and 8.8 degrees.

Preferably, a protrusion is formed between the outer sides of every two adjacent latching surfaces of the driving member.

The latching surface can be a flat surface or an arc surface.

BRIEF DESCRIPTION OF THE DRAWINGS

The objects, features, and achieved efficacies of the invention can be understood from the description and drawings of the following preferred embodiments, in which.

DETAILED DESCRIPTION OF THE INVENTION

Figure 4:
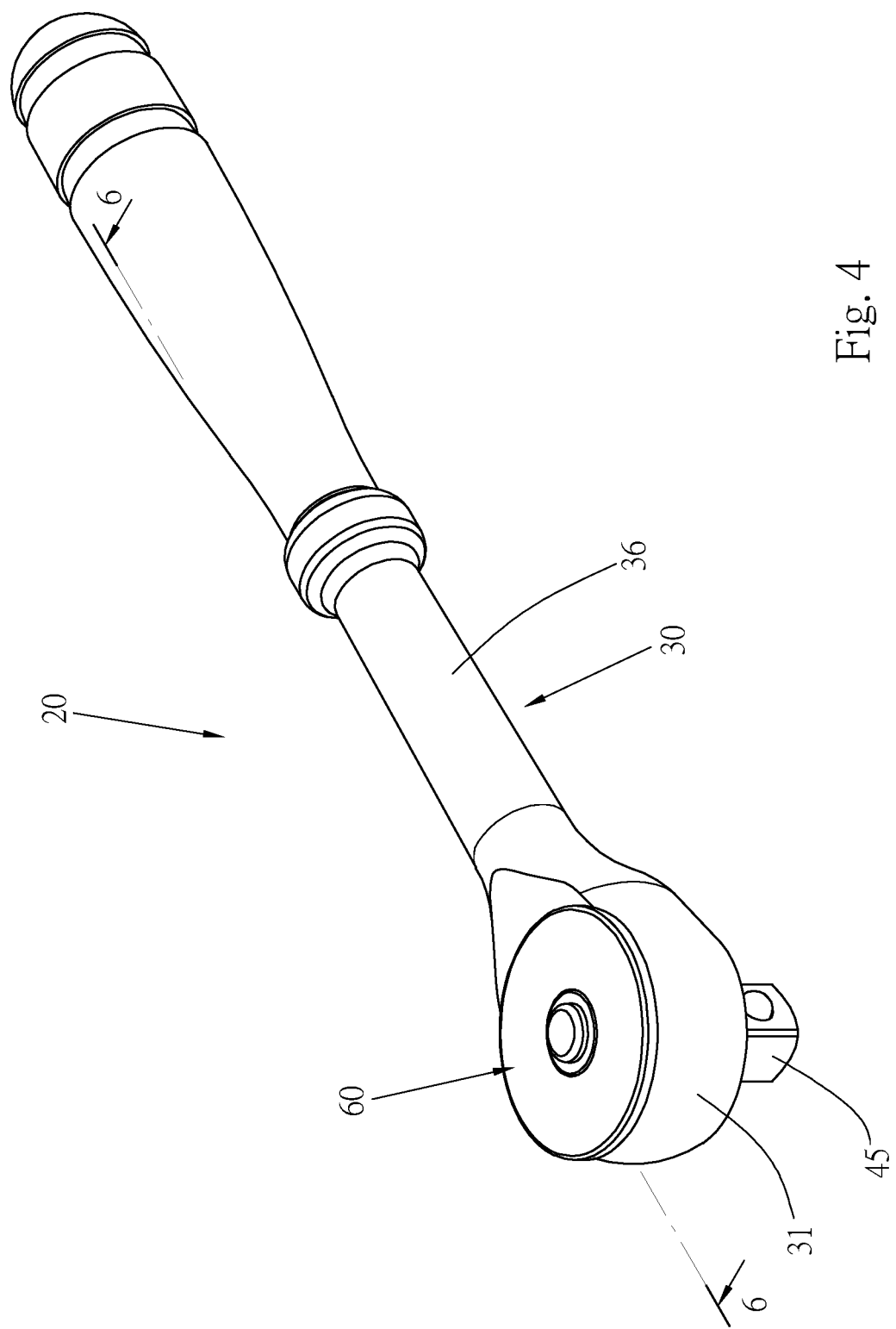
FIG. 4 is a perspective view of a roller wrench of a first preferred embodiment of the invention.
Figure 5:
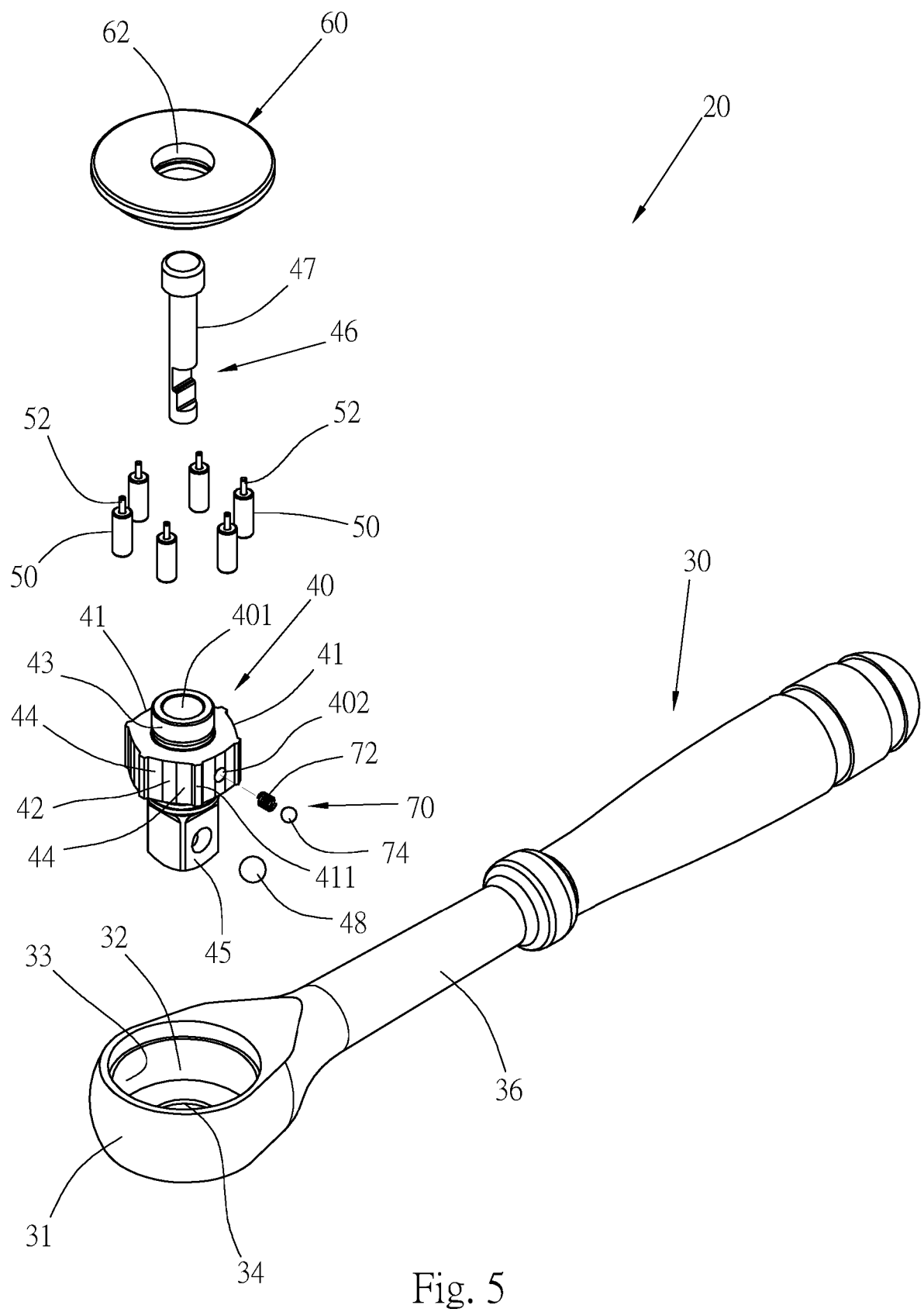
FIG. 5 is an exploded perspective view of FIG. 4.
Figure 6:
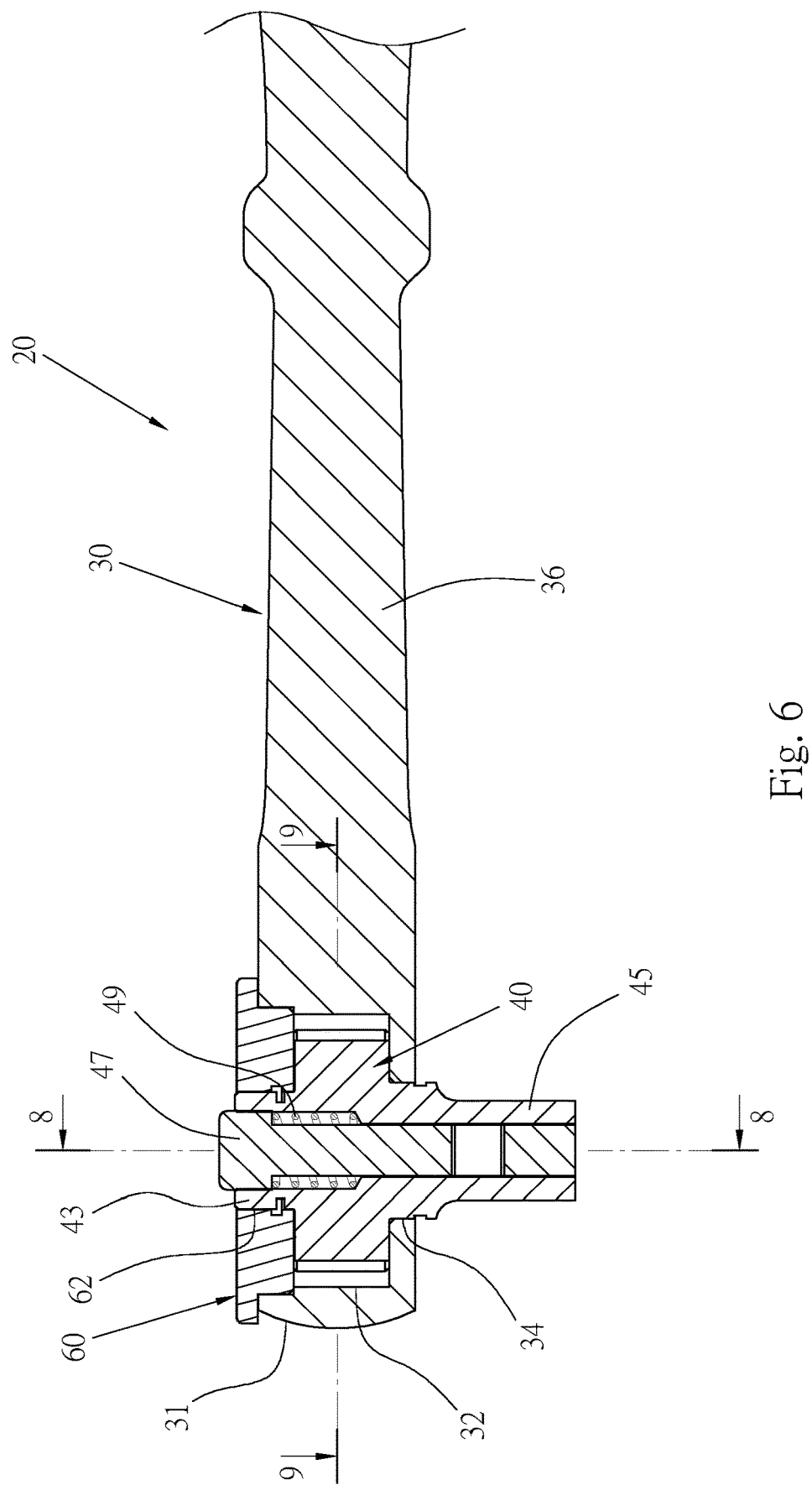
FIG. 6 is a cross-sectional view taken along section line 6-6 of FIG. 4.

Please refer to FIGS. 4 to 6 for a roller wrench 20 of a first preferred embodiment of the invention, the roller wrench 20 comprises: a body 30, a driving member 40, a plurality of rollers 50, a reversing knob 60 and at least one elastic positioning component 70.

The body 30 has a head 31 and a shaft 36 connected to each other, and the head 31 is located at a front end of the shaft 36. A top surface of the head 31 is inwardly recessed with a circular chamber 32; and a bottom surface of the head 31 is penetrated, such as by disposing with a through hole 34.

Figure 7:
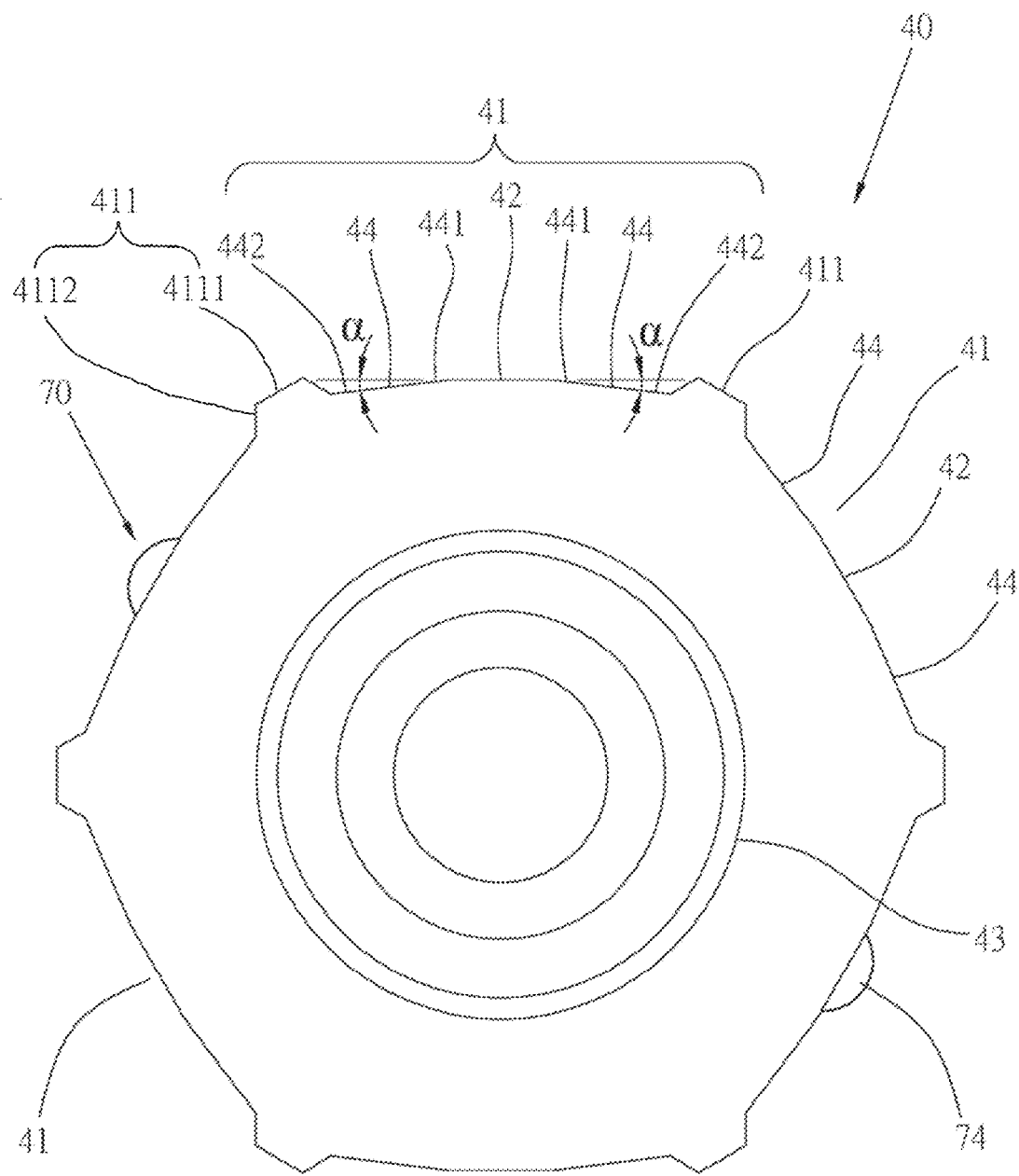
FIG. 7 is a top view of a driving member of the first preferred embodiment of the invention.
Figure 8:
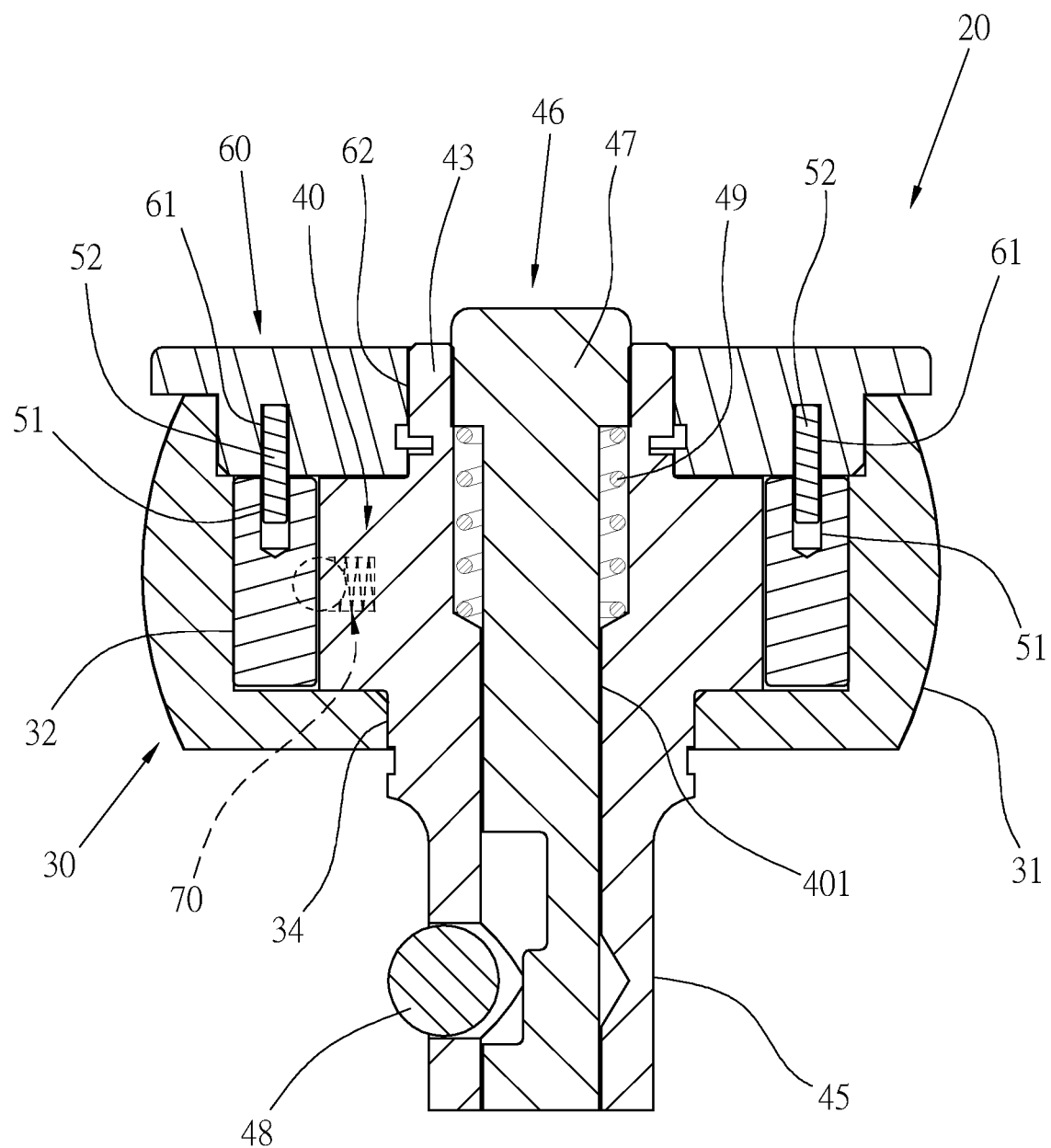
FIG. 8 is a cross-sectional view taken along section line 8-8 of FIG. 6.
Figure 9:
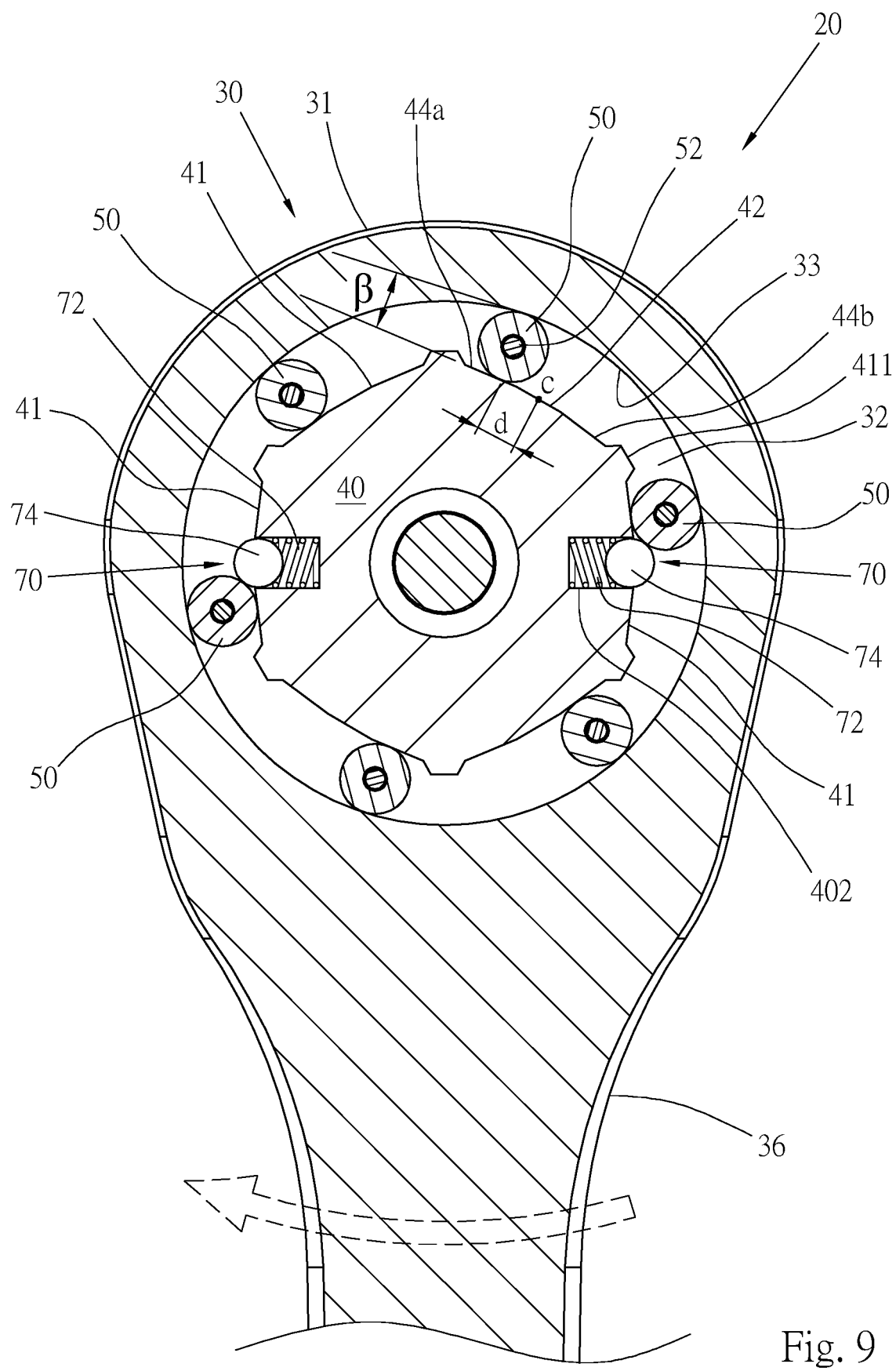
FIG. 9 is a cross-sectional view taken along section line 9-9 of FIG. 6 showing that rollers of the roller wrench are positioned at first positions.

Please refer to FIG. 7 in conjunction with the above figures. The driving member 40 is a regular polygonal component, such as a regular quadrilateral, a regular pentagon, a regular hexagon, a regular octagon, etc., and has a plurality of sides. In the preferred embodiment disclosed in this specification, the driving member 40 is a regular hexagonal component as an example, and has six sides 41. Each of the sides 41 of the driving member 40 has a central area 42 which is a flat surface; each of the sides 41 is respectively provided with a concave (recessed toward an inside of the driving member 40) latching surface 44 on two sides of the central area 42, each of the latching surfaces 44 has an inner side 441 connected to the central area 42 and an outer side 442 away from the central area 42. A concave state of each of the latching surfaces 44 is gradually recessed inwardly from the inner side 441 to the outer side 442, so that the outer side 442 is recessed from each of the sides 41. Although the latching surfaces 44 are flat in appearance, each of the latching surfaces 44 can be a gradually concaved arc surface. On each of the sides 41, an included angle α is formed between each of the latching surfaces 44 and the central area 42, the included angle α is between 1 degree and 10.4 degrees, or between 2.2 degrees and 10.4 degrees, preferably between 4.3 degrees and 8.8 degrees. A protrusion 411 is further provided between the two adjacent sides 41, and each of the protrusions 411 has a plane surface 4111 and a two sloped surfaces 4112, which is capable of increasing a structural strength of the driving member 40. The plane surface 4111 is connected between the two sloped surfaces 4112, and the two sloped surfaces 4112 are connected to the outer sides 442 of the two adjacent latching surfaces 44, respectively. The driving member 40 is installed in the chamber 32 of the head 31 and capable of rotating in the chamber 32. In addition, the driving member 40 is used for coupling and driving threadedly-connecting elements such as nuts or bolts, or coupling sockets. A center of the driving member 40 can be provided with a polygonal sleeve hole to sleeve and connect with a threadedly-connecting element; a bottom surface of the driving member 40 of this embodiment has an insert column 45 protruding outside of the head 31 from the through hole 34. In addition, a quick snap mechanism 46, as shown in FIGS. 5, 8 and 9, is provided in the driving member 40, and includes a rod 47 slidably installed in a slideway 401 of the driving member 40. When the rod 47 is pressed, a bead 48 can be pushed to expose the bead 48 from the insert column 45 to snap with a socket. A spring 49 can be used to reposition the rod 47. The quick snap mechanism 46 is a conventional component and is not a main subject matter of the invention, so it will not be further described.

A quantity of the rollers 50 is the same as a quantity of the sides 41 of the driving member 40, that is, the wrench 20 in the preferred embodiment of the specification has six rollers 50.

Figure 12:
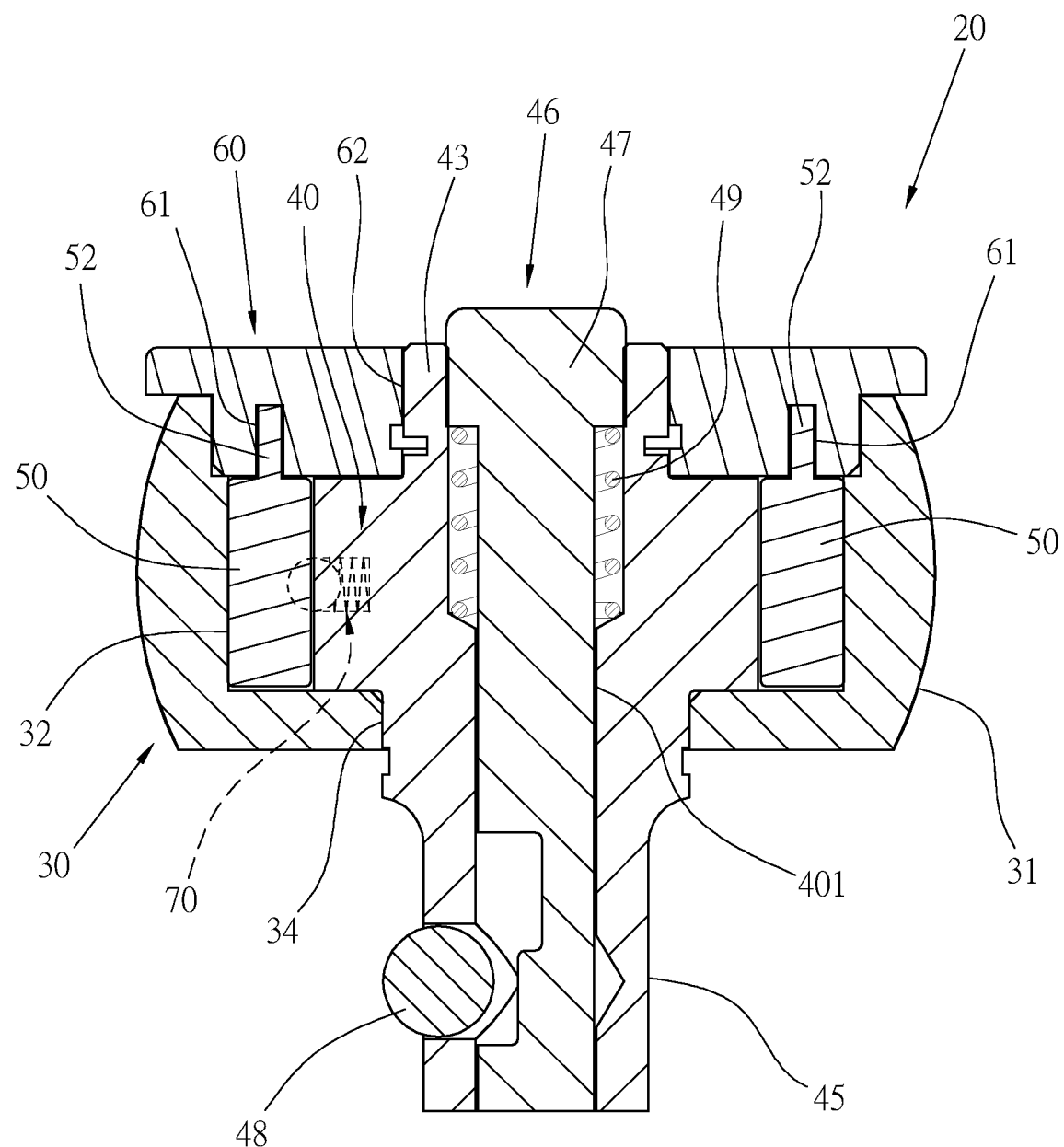
FIG. 12 is similar to FIG. 8 and is a cross-sectional view of the roller wrench of a second preferred embodiment of the invention.

The reversing knob 60 is generally disk-shaped, and the rollers 50 are arranged in a circle and pivotally disposed on a bottom surface of the reversing knob 60 at equal intervals. Please refer to FIG. 8, a top end of each of the rollers 50 is pivotally connected to the bottom surface of the reversing knob 60 by a pivot shaft 52 so that the rollers 50 are capable of rotating freely. In this embodiment, each of the pivot shafts 52 is an independent member, and its two ends are respectively pivotally disposed in a pivot hole 61 in the bottom surface of the reversing knob 60 and in a pivot hole 51 in a top surface of each of the rollers 50. Please refer to FIG. 12 for a cross-sectional view of a second preferred embodiment of the roller wrench 20 of the invention (the same components use the reference numbers of the first preferred embodiment). Each of the pivot shafts 52 can also be integrally formed with each of the rollers 50, and its free end is pivotally disposed in the pivot hole 61 of the reversing knob 60. In a similar way, in implementation, each of the pivot shafts 52 can also be integrally formed with the reversing knob 60, and its free end is pivotally disposed in the pivot hole 51 of each of the rollers 50.

Please refer to FIGS. 8 and 9, the rollers 50 and the reversing knob 60 are installed in the head 31, the rollers 50 are placed in the circular chamber 32, and each of the rollers 50 is located between one of the sides 41 of the driving member 40 and a peripheral wall 33 of the chamber 32; the reversing knob 60 covers the top surface of the head 31, seals the chamber 32, and is capable of being rotated. A protruded wall 43 provided on a top surface of the driving member 40 penetrates from a through hole 62 in a center of the reversing knob 60. The chamber 32, the driving member 40 and the reversing knob 60 are concentric.

The elastic positioning component 70 is installed on a peripheral surface of the driving member 40. This preferred embodiment provides the two elastic positioning components 70, which can be respectively installed on any two of the sides 41 of the driving member 40, for example, on the two different sides 41 not adjacent to each other. The two elastic positioning components 70 are arranged on the two sides 41 of the driving member 40 at equal intervals (180 degrees apart) in this embodiment. Each of the elastic positioning components 70 has an elastic element 72 and an abutting member 74, which are installed in an installation hole 402 of one of the sides 41 of the driving member 40, and are capable of displacing in the installation hole 402. The abutting member 74 is preferably a bead, which is abutted by the elastic element 72 to be exposed from the peripheral surface of the driving member 40. Each of the elastic positioning components 70 is located between the two latching surfaces 44 of the side 41 where the elastic positioning component 70 is located at, that is, located at the central area 42 of the side 41. As shown in FIG. 9, the abutting member 74 of each of the elastic positioning components 70 restricts displacement of one of the rollers 50. Since all the rollers 50 are pivotally connected to the reversing knob 60, the rollers 50 have a relationship of moving simultaneously and are incapable of moving independently. As shown in the figures, when some of the rollers 50 are restrained by the elastic positioning components 70 and incapable of moving freely, all the rollers 50 are incapable of moving freely. Therefore, the two elastic positioning components 70 simultaneously restrain all the rollers 50 to position the rollers 50 and the reversing knob 60.

Figure 10:
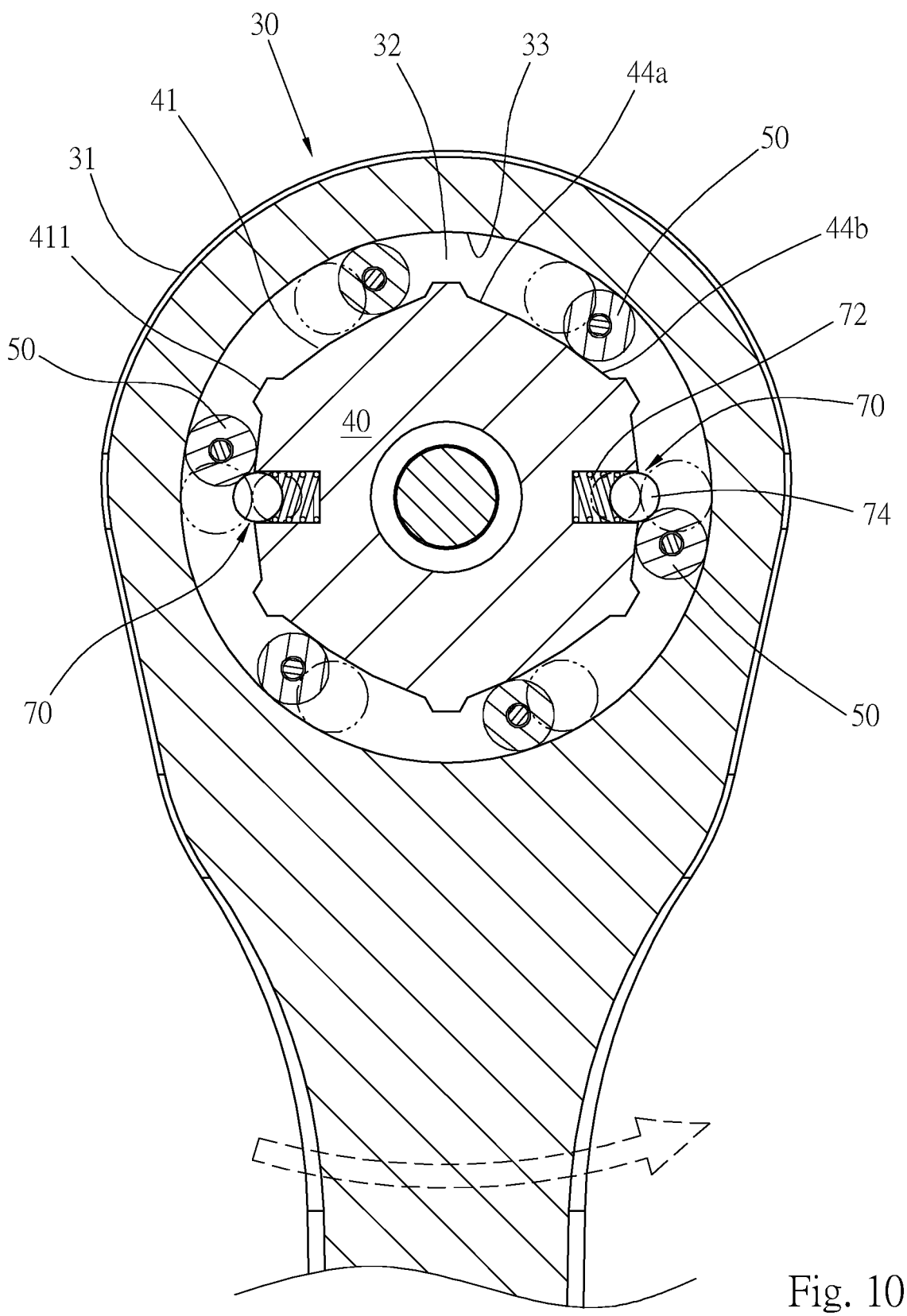
FIG. 10 is similar to FIG. 9 showing that the rollers of the roller wrench are positioned at second positions.

The usage state of the roller wrench 20 will be described hereinafter. The reversing knob 60 is capable of moving the rollers 50 to a first position or a second position to switch the roller wrench 20 in different operating directions. Based on the directions of FIGS. 4, 9 and 10, when the reversing knob 60 is turned counterclockwise, the reversing knob 60 can be switched to the first position, and the rollers 50 can be moved to the first positions as shown in FIG. 9, so that each of the rollers 50 contacts with a latching surface 44a at a left edge of the corresponding side 41; when the reversing knob 60 is turned clockwise, the reversing knob 60 is switched to the second position, and the rollers 50 are moved to the second positions as shown in FIG. 10, so that each of the rollers 50 contacts with a latching surface 44b at a right edge of the corresponding side 41. In order to facilitate identification of the first position and the second position, in this specification, the reference numeral 44a represents the latching surface at the left edge, and the reference numeral 44b represents the latching surface at the right edge. When collectively referring to the latching surface, it is indicated by the reference numeral 44.

FIG. 9 shows that the reversing knob 60 switches the rollers 50 to the first positions, at this time, each of the rollers 50 contacts with the latching surface 44a at the left edge of the corresponding side 41; the two elastic positioning components 70 are capable of restricting the rollers 50 at the first positions, so that the rollers 50 are incapable of moving to the second positions, at the same time, the reversing knob 60 also remains positioned at the first position.

On the outer side 442 of each of the latching surfaces 44a, a gap between each of the latching surfaces 44a and the peripheral wall 33 of the chamber 32 gradually decreases, and on the inner side 441 of each of the latching surfaces 44a, a gap between each of the latching surfaces 44a and the peripheral wall 33 gradually increases. When the rollers 50 are at the first positions, and the wrench 20 is turned clockwise, the rollers 50 move toward a direction (that is, toward the outer sides 442 of the latching surfaces 44a) of a small gap between the latching surfaces 44a and the peripheral wall. Therefore, each of the rollers 50, each of the latching surfaces 44a and the peripheral wall 33 of the chamber 32 are latched with one another, and the wrench 20 is capable of driving the driving member 40 to rotate clockwise, thereby rotating a threadedly-connecting element clockwise. Conversely, when the wrench 20 is turned counterclockwise, the rollers 50 will move toward a direction of a large gap, each of the rollers 50, each of the latching surfaces 44a and the peripheral wall 33 of the chamber 32 are incapable of latching with one another, and the wrench 20 is incapable of driving the driving member 40 to rotate. With this disengaging-engaging effect, the wrench 20 is capable of rotating a threadedly-connecting element unidirectionally (clockwise).

Please refer to FIG. 9, since the outer side 442 of each of the latching surfaces 44a (44) is an inward concave design, an included angle β between each of the latching surfaces 44a and the peripheral wall 33 of the chamber 32 is smaller, and a width of a gap between each of the latching surfaces 44a and the peripheral wall 33 changes relatively gradually, that is, a gap between each of the latching surfaces 44a and the chamber 32 does not reduce quickly, so when each of the rollers 50 moves toward a direction of a small gap, each of the rollers 50 is capable of moving a longer distance. Using a center c of each of the sides 41 as a starting point, a distance d of the roller 50 moving toward a position where the gap is small is longer, so that each of the rollers 50, each of the latching surfaces 44a and the peripheral wall 33 are capable of effectively latching with one another and producing disengaging-engaging function without the occurrence of slippage and losing effect.

When the reversing knob 60 is rotated clockwise to the second position, the rollers 50 are moved to the second positions and respectively contact with the latching surfaces 44b at the right edges of the sides 41, as shown in FIG. 10. In the process of the rollers 50 moving from the latching surfaces 44a at the left edges to the latching surfaces 44b at the right edges, the two elastic positioning components 70 will be compressed, as shown by an imaginary line, so that the abutting members 74 will be moved into the driving member 40, after the rollers 50 have passed over the abutting members 74 and moved to the latching surfaces 44b at the right edges, the abutting members 74 of the two elastic positioning components 70 will be elastically pushed out by the elastic elements 72, and the abutting members 74 will position the rollers 50 on the latching surfaces 44b at the right edges, and also position the reversing knob 60 at the second position.

When the rollers 50 are positioned at the second positions as shown in FIG. 10, and the wrench 20 is rotated counterclockwise, each of the rollers 50 will move toward a direction (that is, toward the outer sides 442 of the latching surfaces 44b) of a small gap between each of the latching surfaces 44b and the peripheral wall 33. Therefore, each of the rollers 50, each of the latching surfaces 44b and the peripheral wall 33 of the chamber 32 are latched with one another, and the wrench 20 is capable of driving the driving member 40 to rotate counterclockwise. Conversely, when the wrench 20 is turned clockwise, the rollers 50 will move toward a direction of a large gap, each of the rollers 50, each of the latching surfaces 44b and the peripheral wall 33 of the chamber 32 are incapable of latching with one another, and the wrench 20 is incapable of driving the driving member 40 to rotate. Thereby, the wrench 20 is capable of rotating a threadedly-connecting element unidirectionally (counterclockwise).

The wrench 20 of this embodiment (and the wrench 20 of the second preferred embodiment of FIG. 12) has the following efficacies of being capable of overcoming the disadvantages of conventional structures. Firstly, since the outer side 442 of each of the latching surfaces 44 of the invention is an inward concave design, when each of the rollers 50 moves toward a direction of a small gap, each of the rollers 50 is capable of moving a longer distance (as shown in FIG. 9), so that each of the rollers 50, each of the corresponding latching surfaces 44 and the peripheral wall 33 of the chamber 32 are capable of effectively latching with one another and producing disengaging-engaging function. In addition, please refer to FIG. 11, since a degree of the included angle β between the latching surface 44 and the peripheral wall 33 is smaller, when latching is formed, a contact point G between the peripheral wall 33 and the roller 50, and a contact point H between the latching surface 44 and the roller 50 can be closer to a center of the roller 50, which are capable of increasing a torque that the wrench 20 is capable of withstanding.

Figure 1:
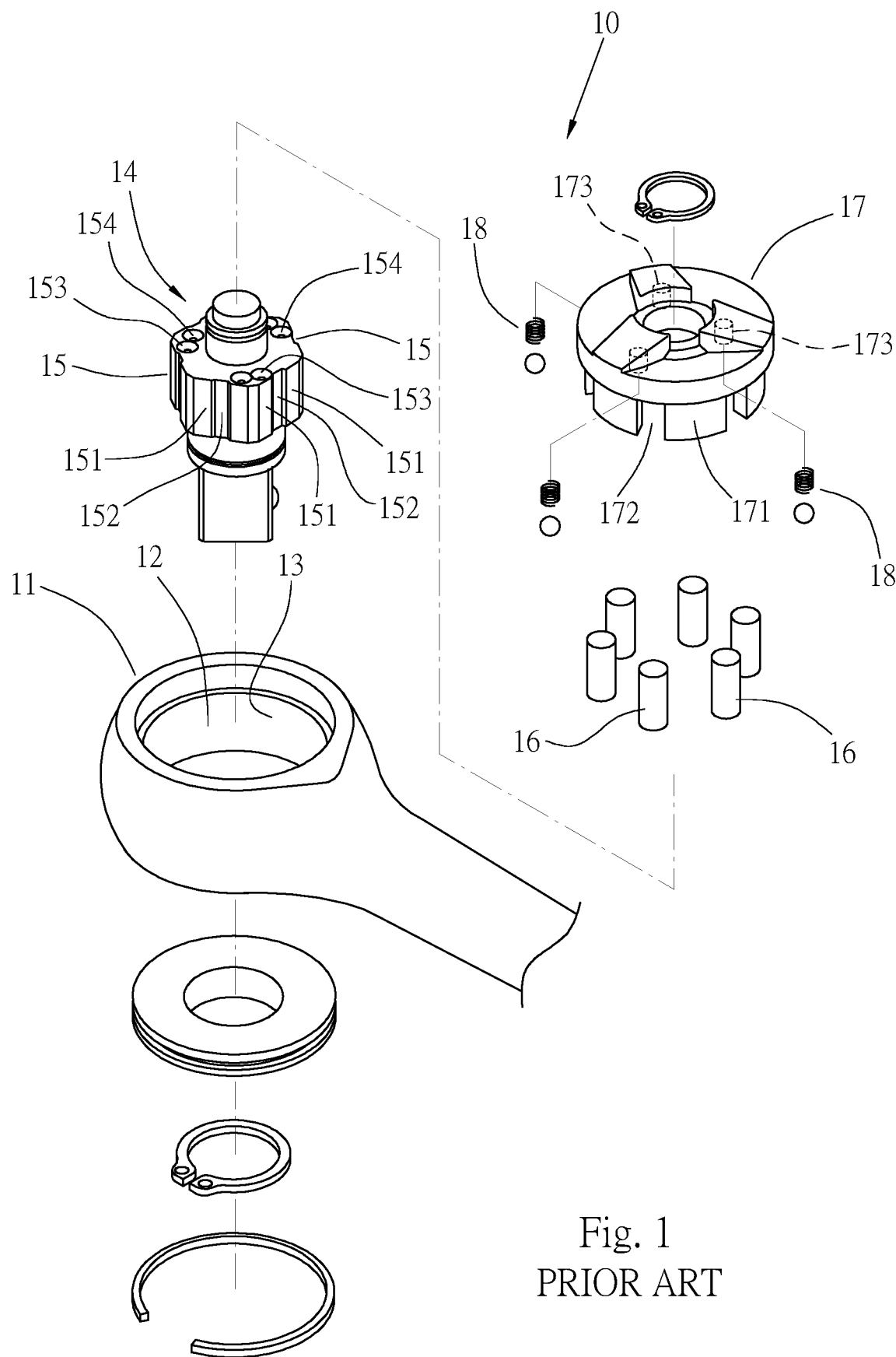
FIG. 1 is an exploded perspective view of a conventional roller wrench.
Figure 2:
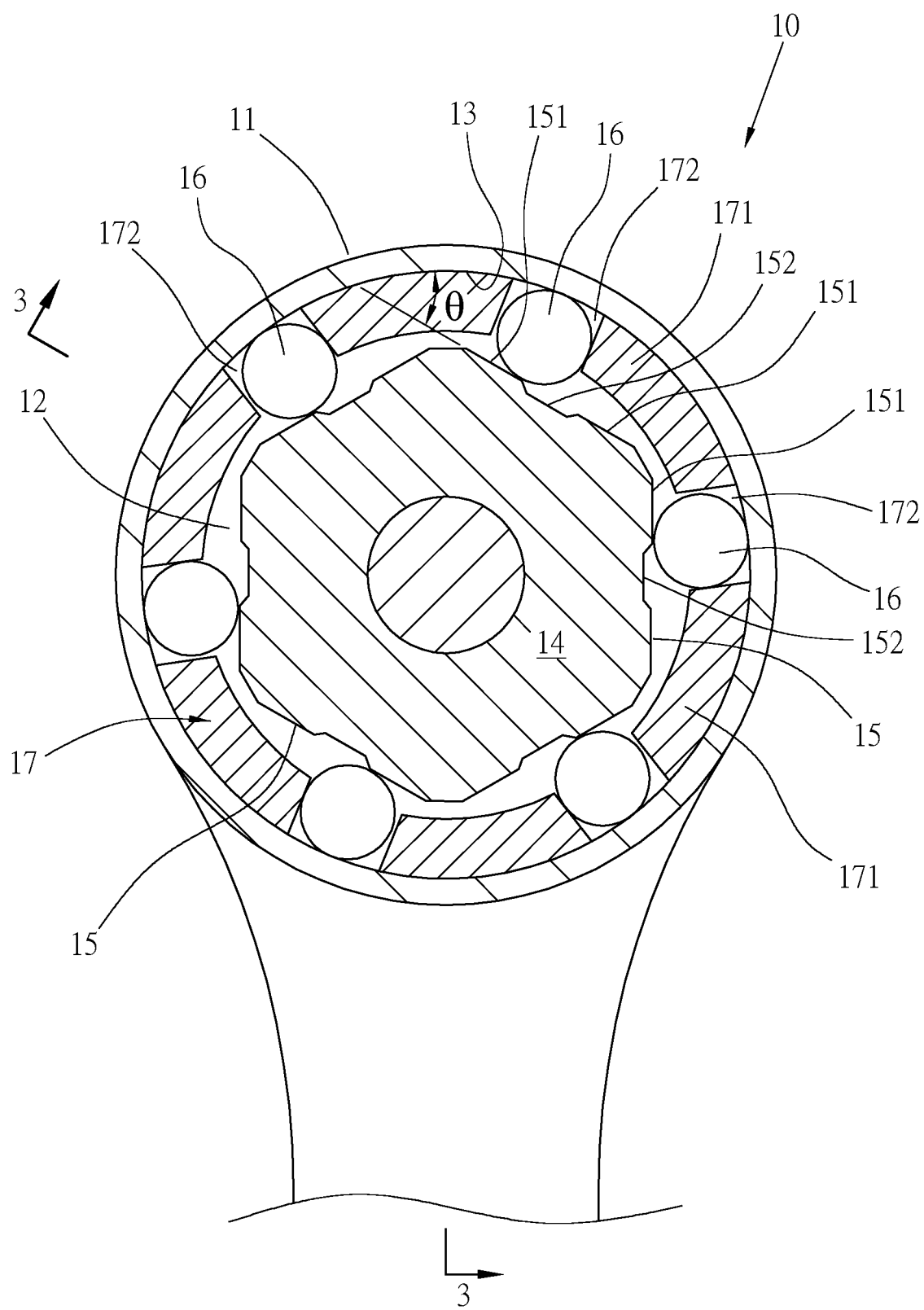
FIG. 2 is a combinational cross-sectional view of FIG. 1.
Figure 3:
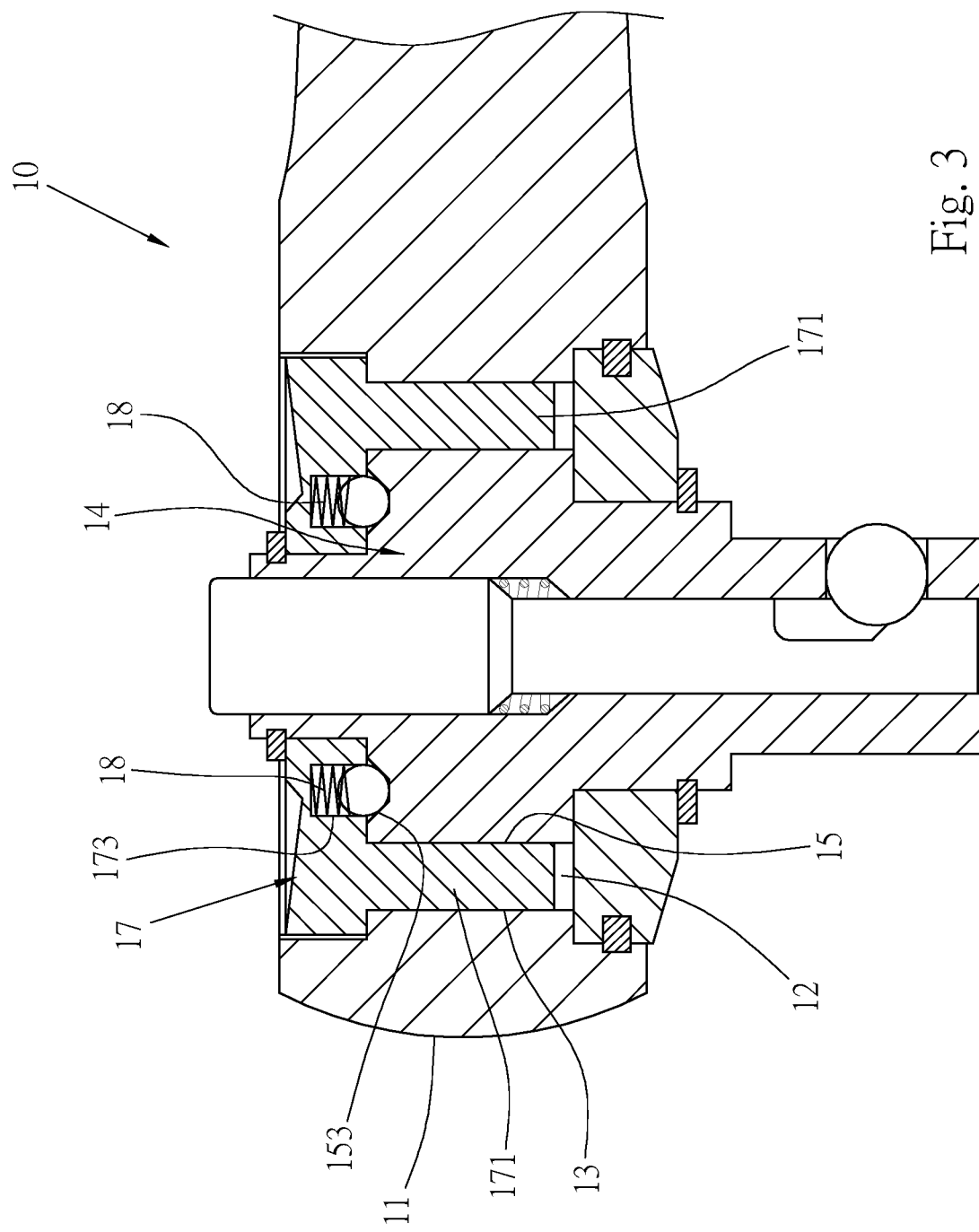
FIG. 3 is a cross-sectional view taken along section line 3-3 of FIG. 2.

Furthermore, in the structural design of the invention, the elastic positioning component 70 has the functions of the wall 171 and the elastic positioning component 18 of the conventional structure of FIG. 1, that is, the elastic positioning component 70 is capable of reliably positioning the roller 50 at the first position or the second position, unless an operator turns the reversing knob 60 by hand, the rollers 50 remain in position and are incapable of moving from the first positions to the second positions or from the second positions to the first positions. At the same time, the elastic positioning component 70 positions the reversing knob 60 at the first or second position.

Thirdly, as for positioning the roller 50, the structure of the invention is capable of eliminating the wall 171 of the conventional structure; and as for positioning the reversing knob 60 and the roller 50, the invention only needs to install the elastic positioning component 70 in the driving member 40, the reversing knob 60 and the roller 50 can be positioned by using the elastic abutting relationship between the elastic positioning component 70 and the roller 50. Compared with the elastic positioning component 18 and the positioning holes 153, 154 of the conventional structure, the elastic positioning structure of the invention is significantly more simplified. Therefore, the structure of the invention is easier to be manufactured and can reduce costs.

Figure 13:
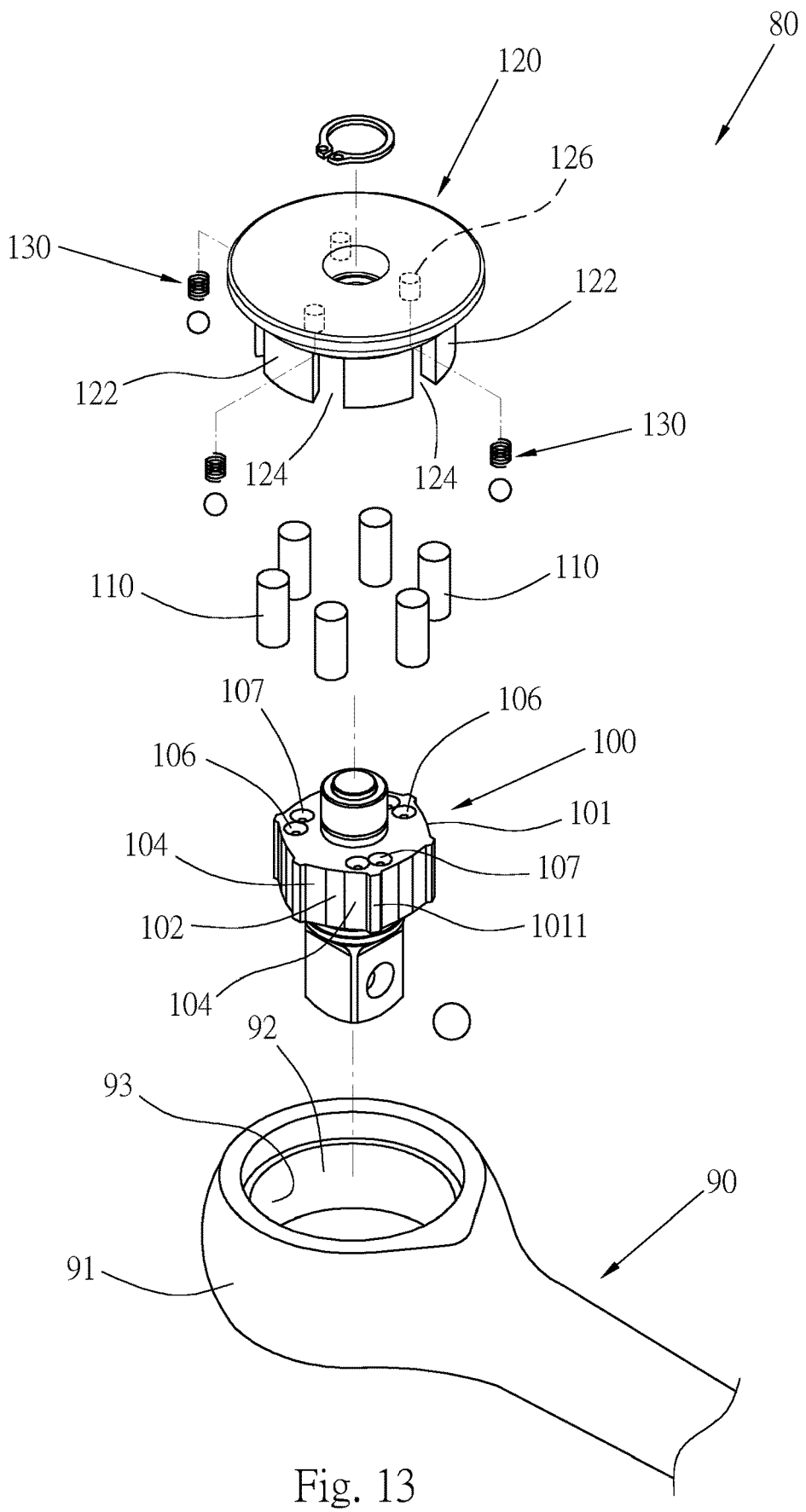
FIG. 13 is an exploded perspective view of the roller wrench of a third preferred embodiment of the invention.
Figure 14:
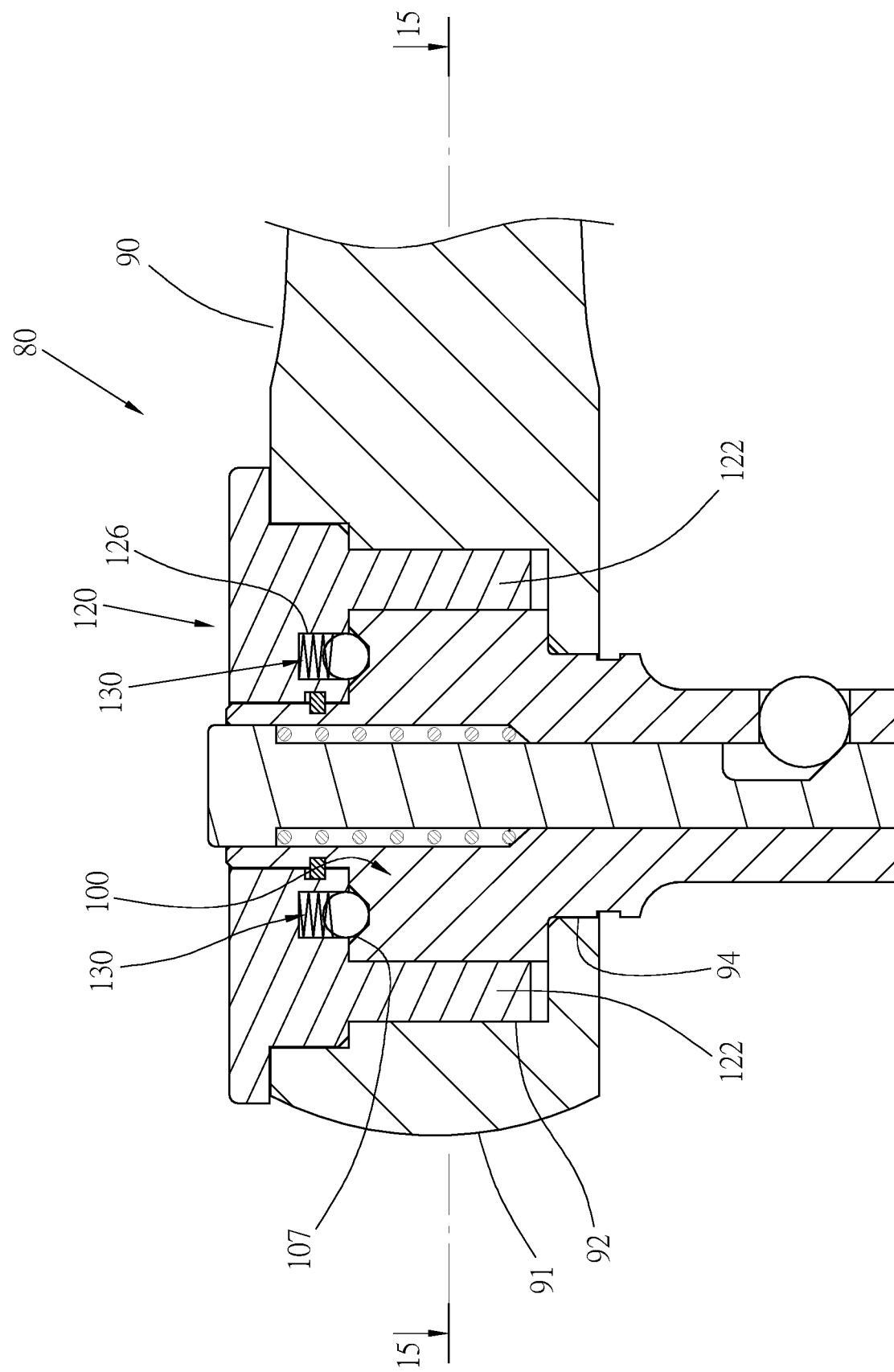
FIG. 14 is a combinational cross-sectional view of FIG. 13 and a vertical cross-sectional view.
Figure 15:
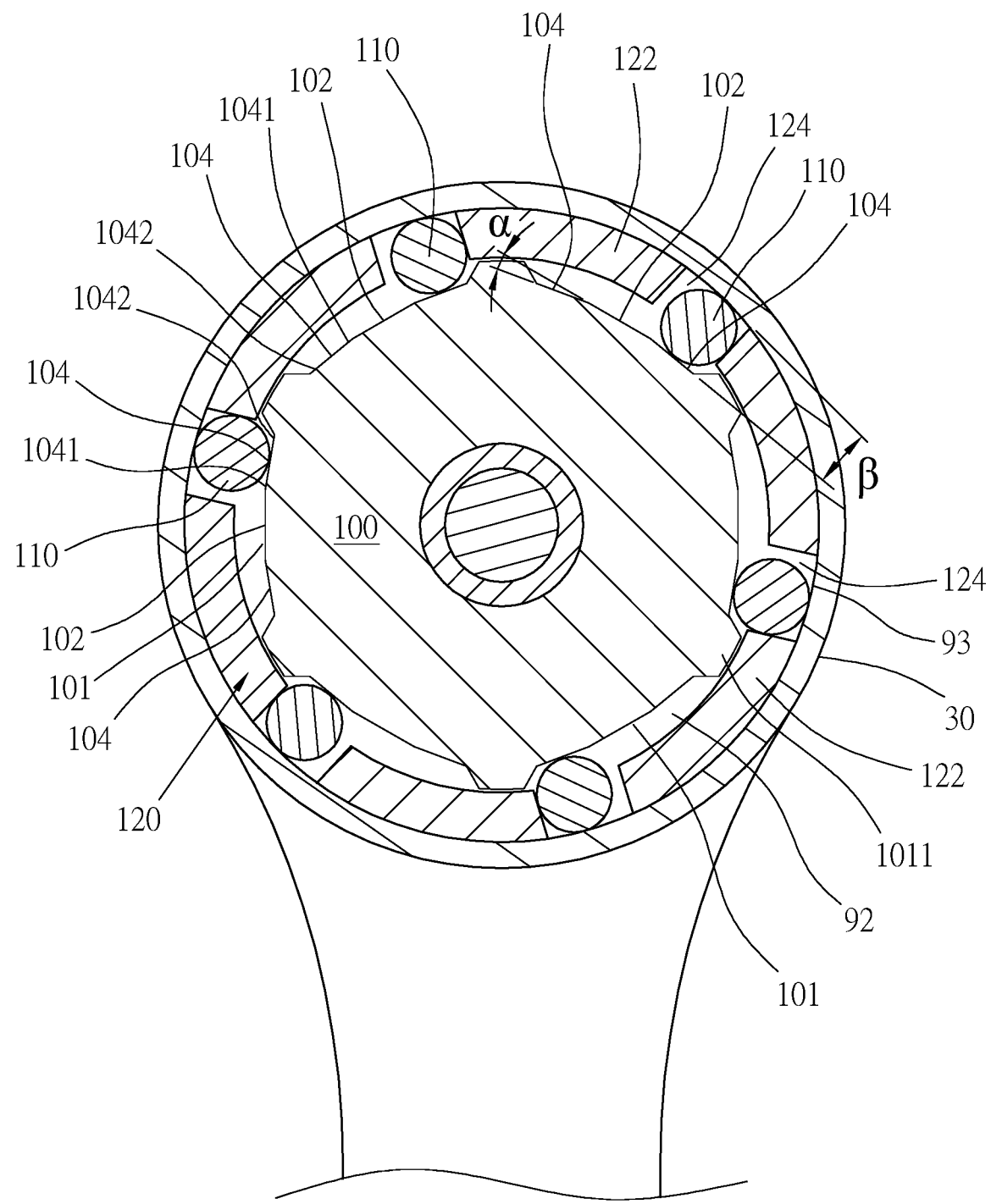
FIG. 15 is a cross-sectional view taken along section line 15-15 of FIG. 14.

FIGS. 13 to 15 are a third preferred embodiment of a roller wrench 80 of the invention, which also comprises: a body 90, a driving member 100, a plurality of rollers 110, a reversing knob 120 and at least one elastic positioning component 130.

A top surface of a head 91 of the body 90 is recessed with a circular chamber 92, and a bottom surface of the head 91 is provided with a through hole 94.

The driving member 100 is installed in the circular chamber 92 of the head 91, and is a regular polygonal component, such as a regular hexagon, and has six sides 101, each of the sides 101 has a central area 102 and two latching surfaces 104 located on two sides of the central area 102. The two latching surfaces 104 are recessed from each of the sides 101, each of the latching surfaces 104 has an inner side 1041 connected to the central area 102 and an outer side 1042 away from the central area 102, and a concave state of each of the latching surfaces 104 is gradually recessed inwardly from the inner side 1041 to the outer side 1042. An included angle α is formed between each of the latching surfaces 104 and each of the central areas 102, and a degree of the included angle α is between 1 degree and 10.4 degrees, or between 2.2 degrees and 10.4 degrees, preferably between 4.3 degrees and 8.8 degrees. A protrusion 1011 is formed between the outer sides 1042 of the two adjacent latching surfaces 104 of the two adjacent sides 101.

A quantity of the rollers 110 is the same as a quantity of the sides 101 of the driving member 100. Therefore, there are six rollers 110 installed in the circular chamber 92 and located between the six sides 101 and a peripheral wall 93 of the chamber 92 respectively.

The reversing knob 120 is installed on a top surface of the head 91 and closes an opening of a top surface of the chamber 92. A bottom surface of the reversing knob 120 is provided with walls at equal intervals and with a quantity equal to that of the rollers 110, that is, six walls 122, and there are six limiting grooves 124 formed between the six walls 122. The six walls 122 are arranged at equal intervals to form a circle; the six rollers 110 are respectively accommodated in the six limiting grooves 124 and are respectively positioned by the limiting grooves 124, as shown in FIG. 15. The reversing knob 120 is capable of being rotated and positioned at the first position and the second position by the three elastic positioning components 130, the three elastic positioning components 130 are respectively installed in three holes 126 provided on the bottom surface of the reversing knob 120, one end of each of the three elastic positioning components 130 is respectively elastically snapped into a first set of positioning holes 106 or a second set of positioning holes 107 of the driving member 100, and each of the sets of the positioning holes 106, 107 is composed of three positioning holes in this embodiment.

When the reversing knob 120 is rotated to the second position, the reversing knob 120 drives the rollers 110 to the second positions, as shown in FIG. 15, so that each of the rollers 110 contacts with the latching surface 104 at a right edge of each of the sides 101, the three elastic positioning components 130 are elastically snapped into the second set of the positioning holes 107, and the reversing knob 120 and the rollers 110 are kept positioned at the second positions. When the reversing knob 120 is rotated to the first position, the reversing knob 120 moves the rollers 110 to the first positions, so that each of the rollers 110 contacts with the latching surface 104 at a left edge of each of the sides 101, the three elastic positioning components 130 are elastically snapped into the first set of the positioning holes 106, and the reversing knob 120 and the rollers 110 are kept positioned at the first positions.

Figure 11:
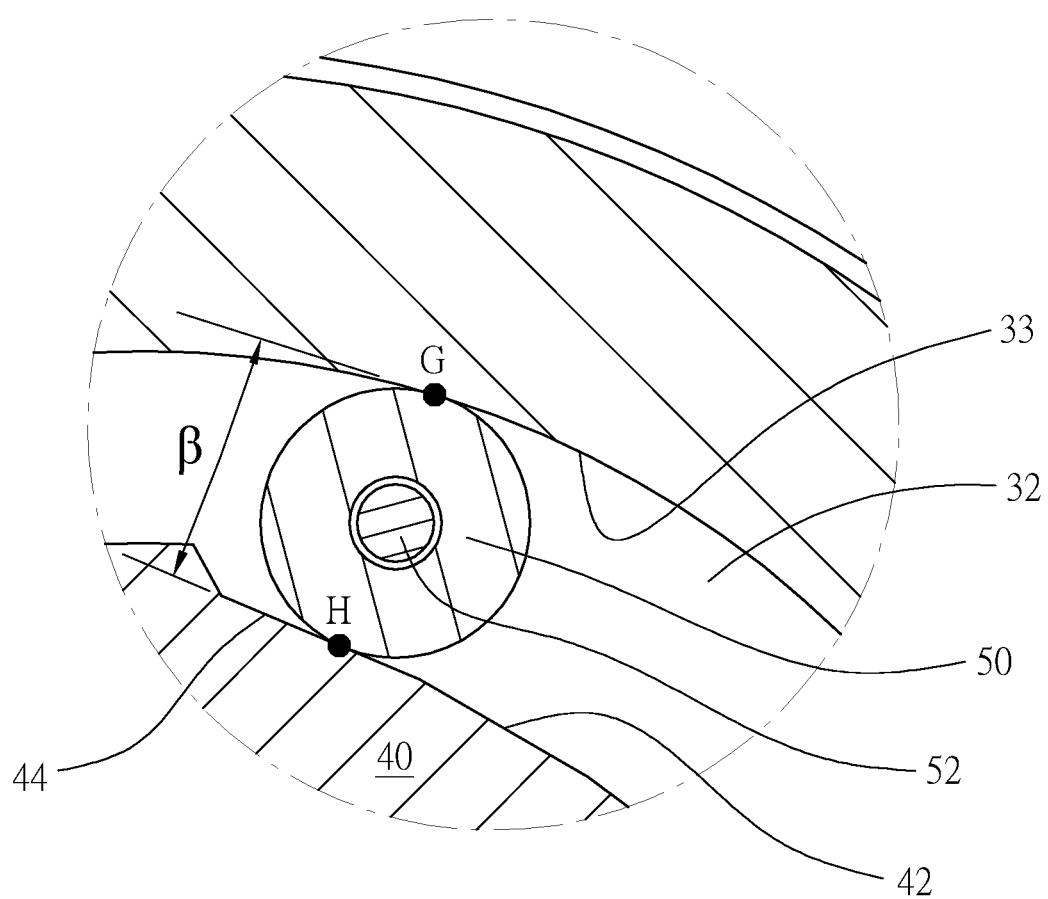
FIG. 11 is an enlarged schematic view of the rollers, latching surfaces and a peripheral wall of a chamber of the wrench.

Since the outer side 1042 of each of the latching surfaces 104 is an inward concave design, the included angle β between each of the latching surfaces 104 and the peripheral wall 93 of the chamber 92 is smaller, and a width of a gap between the each of the latching surfaces 104 and the peripheral wall 93 changes relatively gradually, so when each of the rollers 110 moves toward a direction of a small gap, each of the rollers 110 is capable of moving a longer distance (can be understood from FIG. 9), so that each of the rollers 110, each of the corresponding latching surfaces 104 and the peripheral wall 93 are capable of effectively latching with one another and producing disengaging-engaging function without the occurrence of slippage and losing effect. Furthermore, since a degree of the included angle β between each of the latching surfaces 104 and the peripheral wall 93 is smaller, when latching is formed, a contact point G between the peripheral wall 93 and the roller 110, and a contact point H between the latching surface 104 and the roller 110 can be closer to a center of the roller 110 (as shown in FIG. 11), which are capable of increasing a torque that the wrench 80 is capable of withstanding.

Figure 16:
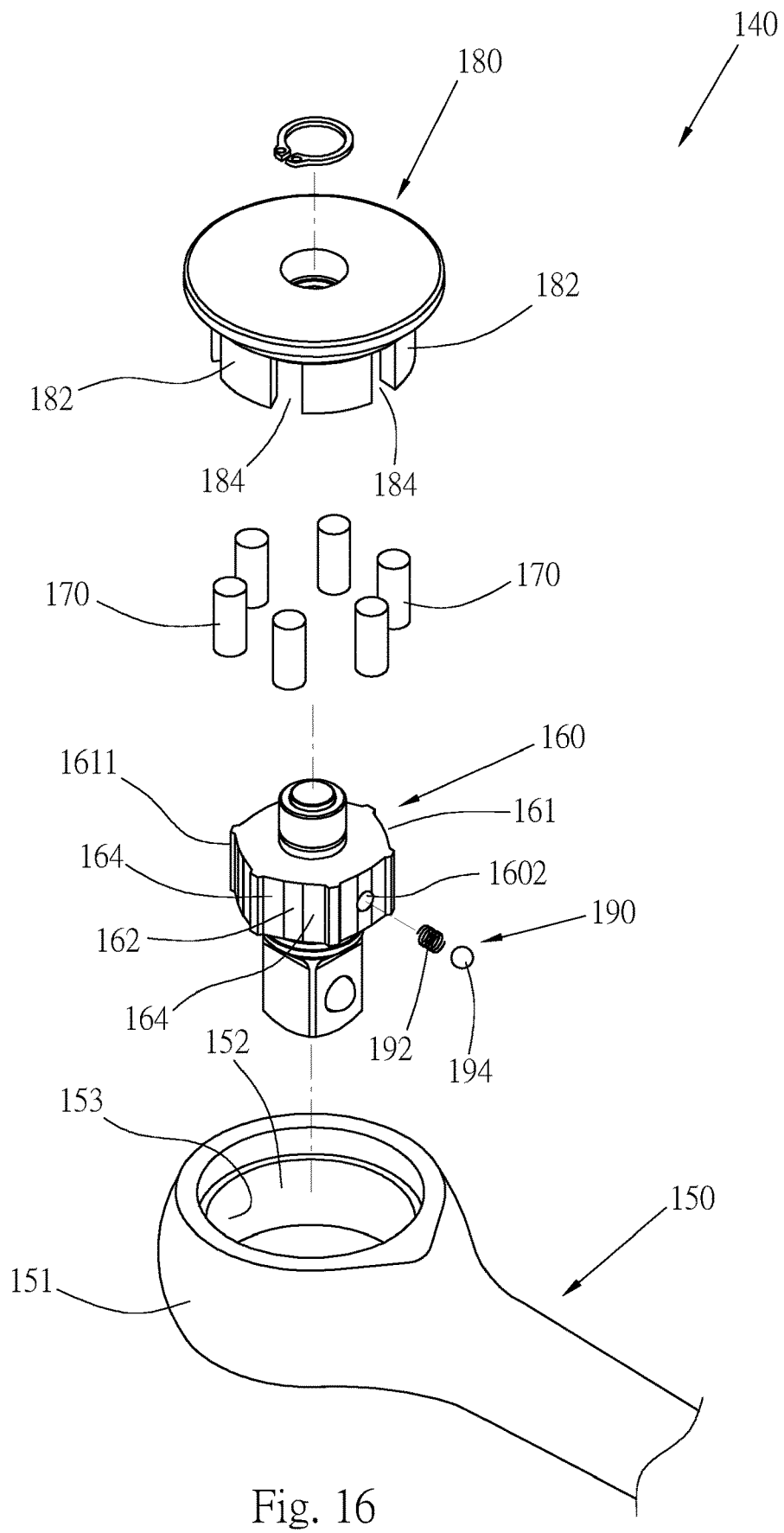
FIG. 16 is an exploded perspective view of the roller wrench of a fourth preferred embodiment of the invention.
Figure 17:
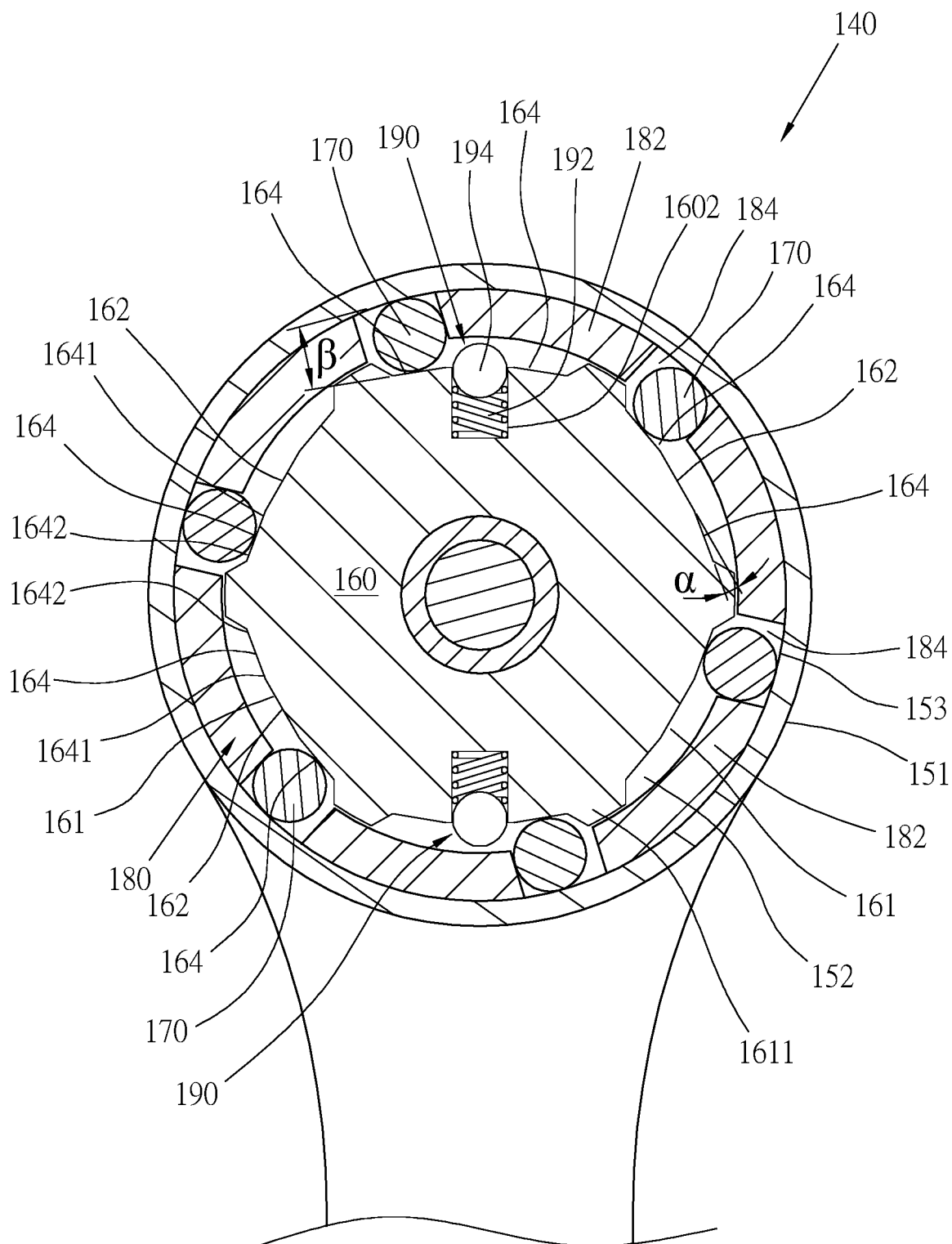
FIG. 17 is a combinational cross-sectional view of FIG. 16 and a horizontal cross-sectional view showing that the rollers are positioned at the first positions.
Figure 18:
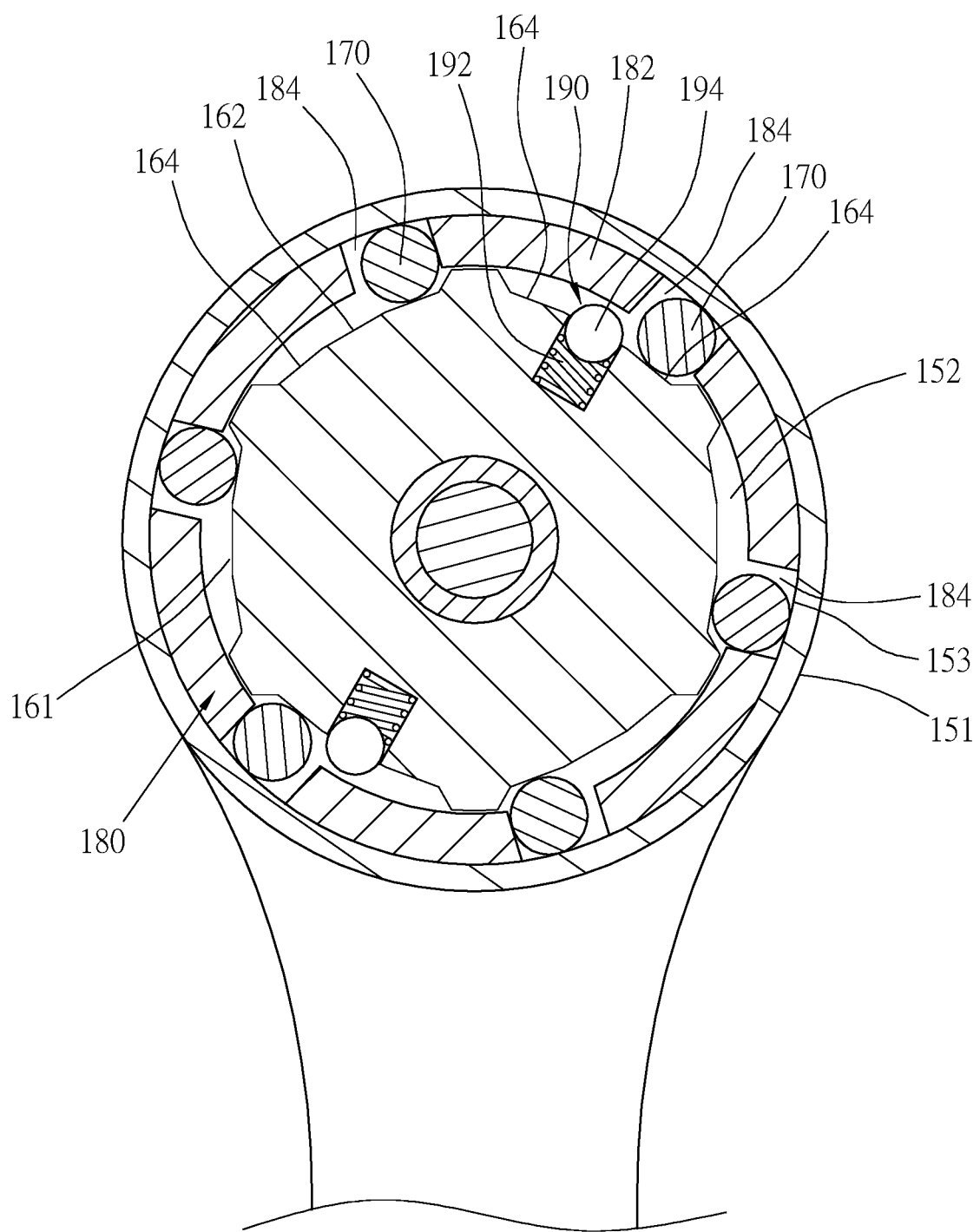
FIG. 18 is similar to FIG. 17 showing the rollers are positioned at the second positions.

FIGS. 16 to 18 are a fourth preferred embodiment of a roller wrench 140 of the invention, which also comprises: a body 150, a driving member 160, a plurality of rollers 170, a reversing knob 180 and at least one elastic positioning component 190.

A head 151 of the body 150 is recessed with a circular chamber 152.

The driving member 160 is installed in the circular chamber 152 of the head 151, and is a regular polygonal component, such as a regular hexagon, and has six sides 161, each of the sides 161 has a central area 162 and two inwardly recessed latching surfaces 164 located on two sides of the central area 162. Each of the latching surfaces 164 has an inner side 1641 connected to the central area 162 and an outer side 1642 away from the central area 162, and a concave state of each of the latching surfaces 164 is gradually recessed inwardly from the inner side 1641 to the outer side 1642. A protrusion 1611 is formed between the outer sides 1642 of the two adjacent latching surfaces 164 of the two adjacent sides 161. The included angle α is formed between each of the latching surfaces 164 and each of the central areas 162, and a degree of the included angle α is between 1 degree and 10.4 degrees, or between 2.2 degrees and 10.4 degrees, preferably between 4.3 degrees and 8.8 degrees. An included angle β is also formed between each of the latching surfaces 164 and a peripheral wall 153 of the chamber 152.

The six rollers 170 are installed in the circular chamber 152 and are respectively located between the six sides 161 and the peripheral wall 153 of the chamber 152.

A bottom surface of the reversing knob 180 is provided with six walls 182, which are arranged in a circular shape at equal intervals, and has six limiting grooves 184 formed between the six walls 182. The reversing knob 180 is installed on a top surface of the head 151, the walls 182 and the limiting grooves 184 are located in the chamber 152; and the six rollers 170 are respectively limited in the six limiting grooves 184.

This embodiment has two elastic positioning components 190 installed on a peripheral surface of the driving member 160. The two elastic positioning components 190 can be installed on any two of the sides 161 of the driving member 160, and each of the elastic positioning components 190 is preferably disposed at a center of the side 161 where the elastic positioning component 190 is located at (for example, disposed in the central area 162 of the side 161), that is, located between the two latching surfaces 164 of the side 161. Each of the elastic positioning components 190 has an elastic element 192 and an abutting member 194, which are installed in an installation hole 1602 of one of the sides 161 of the driving member 160, and the abutting member 194 is abutted by the elastic element 192 to be exposed from the peripheral surface of the driving member 160.

The reversing knob 180 is capable of being switched between a first position and a second position, and driving the rollers 170 to displace. FIG. 17 shows that the reversing knob 180 is located at the first position, and at the same time, the limiting grooves 184 of the reversing knob 180 position the rollers 170 at the first positions, so that the rollers 170 contact with the latching surfaces 164 at left edges of the sides 161. The abutting members 194 of the two elastic positioning components 190 are capable of limiting the rollers 170 at the first positions, thereby positioning the reversing knob 180 at the first position.

When the reversing knob 180 is rotated to the second position, as shown in FIG. 18, the reversing knob 180 drives the rollers 170 to move to the second positions and contact with the latching surfaces 164 at right edges of the sides 161. After switching, the abutting members 194 of the two elastic positioning components 190 limit the rollers 170 at the second positions, thereby positioning the reversing knob 180 at the second position.

The latching surfaces 164 of the driving member 160 of this embodiment are capable of causing the driving member 160, the rollers 170, and the peripheral wall 153 of the chamber 152 to be effectively latched with one another and to produce effective disengaging-engaging function, and a contact point between the peripheral wall 153 of the chamber 152 and the roller 170 and a contact point between the latching surface 164 and the roller 170 to be closer to a center of the roller 170.

The two elastic positioning components 190 are capable of effectively positioning the reversing knob 180 and the rollers 170 at the first positions or the second positions. Compared with the conventional structure in FIG. 1, the structure of the elastic positioning components 190 of this embodiment is simpler, easy to be manufactured and can reduce costs.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A roller wrench comprising:
a body with a head, a chamber being disposed in the head;
a driving member being a regular component with a plurality of sides, the driving member being installed in the chamber of the head and capable of rotating in the chamber;
a plurality of rollers with a quantity the same as a quantity of the sides of the driving member, the rollers being installed in the chamber and respectively located between the sides of the driving member and a peripheral wall of the chamber;
a reversing knob rotatably installed on the head, the reversing knob being capable of driving the rollers to move in the chamber, so that each of the rollers moves between one edge and another edge of each of the sides of the driving member; and
at least one elastic positioning component installed at the driving member and comprising an elastic element and an abutting member;
wherein each of the sides of the driving member has a central area, a latching surface is respectively provided on each side of two sides of the central area, the central area protrudes outward the two adjacent latching surfaces, each of the latching surfaces has an inner side connected to the central area and an outer side located away from the central area, a concave state of each of the latching surfaces is gradually concaved inwardly from the inner side to the outer side; for each latching surface, an included angle is formed between the inner side and the connected central area; when each of the rollers is located on one edge of each of the sides, a peripheral surface of each said roller of the plurality of rollers contacts with the latching surface and the peripheral wall of the chamber, so that the body, the rollers and the driving member are latched with one another, thereby the roller wrench is capable of driving the driving member; the driving member has a plurality of protrusions, each of the protrusions has a plane surface and two sloped surfaces, the plane surface is connected between the two sloped surfaces, the two sloped surfaces are connected to the outer sides of the two adjacent latching surfaces, respectively, a first one of the central areas is located between a first one of the protrusions and a second one of the protrusions, the sloped surface of the first one of the protrusions adjacent to the first one of the central areas is not parallel to the sloped surface of the second one of the protrusions adjacent to the first one of the central areas, and the abutting member of the at least one elastic positioning component is abutted by the elastic element of the at least one elastic positioning component to be exposed from a peripheral surface of the driving member so as to be located between two of the latching surfaces that belongs to one of the sides.

2. The roller wrench as claimed in claim 1, wherein each of the latching surfaces is a flat surface.

3. The roller wrench as claimed in claim 1, wherein each of the latching surfaces is an arc surface.

4. The roller wrench as claimed in claim 1, wherein the central area of each of the sides is a flat surface.

5. The roller wrench as claimed in claim 4, wherein each of the latching surfaces is a flat surface.

6. The roller wrench as claimed in claim 4, wherein each of the latching surfaces is an arc surface.

7. The roller wrench as claimed in claim 1, wherein the included angle is between 1 degree and 10.4 degrees.

8. The roller wrench as claimed in claim 7, wherein each of the latching surfaces is a flat surface.

9. The roller wrench as claimed in claim 7, wherein each of the latching surfaces is an arc surface.

10. The roller wrench as claimed in claim 1, wherein the included angle is between 4.3 degrees and 8.8 degrees.

11. The roller wrench as claimed in claim 10, wherein each of the latching surfaces is a flat surface.

12. The roller wrench as claimed in claim 10, wherein each of the latching surfaces is an arc surface.

* * * * *